United States Patent [19]

Swinderman et al.

[11] Patent Number: 4,927,003
[45] Date of Patent: May 22, 1990

[54] HEATED CONVEYOR BELT CLEANER

[75] Inventors: Robert T. Swinderman, Kewanee; David W. Mueller, Neponset, both of Ill.

[73] Assignee: Martin Engineering Company, Neponset, Ill.

[21] Appl. No.: 360,444

[22] Filed: Jun. 2, 1989

[51] Int. Cl.$^5$ ............................................. B65G 45/10
[52] U.S. Cl. .................... 198/497; 15/256.5; 198/952
[58] Field of Search ........................ 198/497–499, 198/494, 952; 15/250.05, 250.06, 256.5, 256.53

[56] References Cited

U.S. PATENT DOCUMENTS

| | | | |
|---|---|---|---|
| 2,755,499 | 7/1956 | Mays | 15/250.06 |
| 2,885,069 | 5/1959 | Bowen | 198/497 X |
| 3,409,930 | 11/1968 | Linker | 15/250.06 |
| 4,182,444 | 1/1980 | Fisher | 198/499 |
| 4,249,650 | 2/1981 | Stahura | 198/499 |
| 4,344,525 | 8/1982 | Bancroft et al. | 198/497 X |
| 4,533,035 | 8/1985 | Reiter | 198/499 |

*Primary Examiner*—David A. Bucci
*Assistant Examiner*—Cheryl L. Gastineau
*Attorney, Agent, or Firm*—Lee, Mann, Smith, McWilliams & Sweeney

[57] ABSTRACT

A heated conveyor belt cleaner is provided including a support shaft positioned adjacent to the belt to be cleaned and generally transverse to the belt's direction of travel, an electric resistance heating element is disposed within the support shaft, a heat conducting medium is disposed between the support shaft and the heating element to effectively conduct heat from said heating element to the support shaft, a mounting sleeve concentrically surrounding the support shaft for mounting a belt scraper element on the support shaft, at least one belt scraper element connected to the mounting sleeve and, through the mounting sleeve, to the support shaft, such that heat generated within the support shaft is communicated from the support shaft through the mounting sleeve to the scraper element to heat the scraper element for effective removal of adherent materials from the conveyer belt. A temperature sensor communicates the temperature of the scraper element to a thermostat which regulates the electric resistance heating element to provide a uniform preselected temperature at the scraper element.

7 Claims, 2 Drawing Sheets

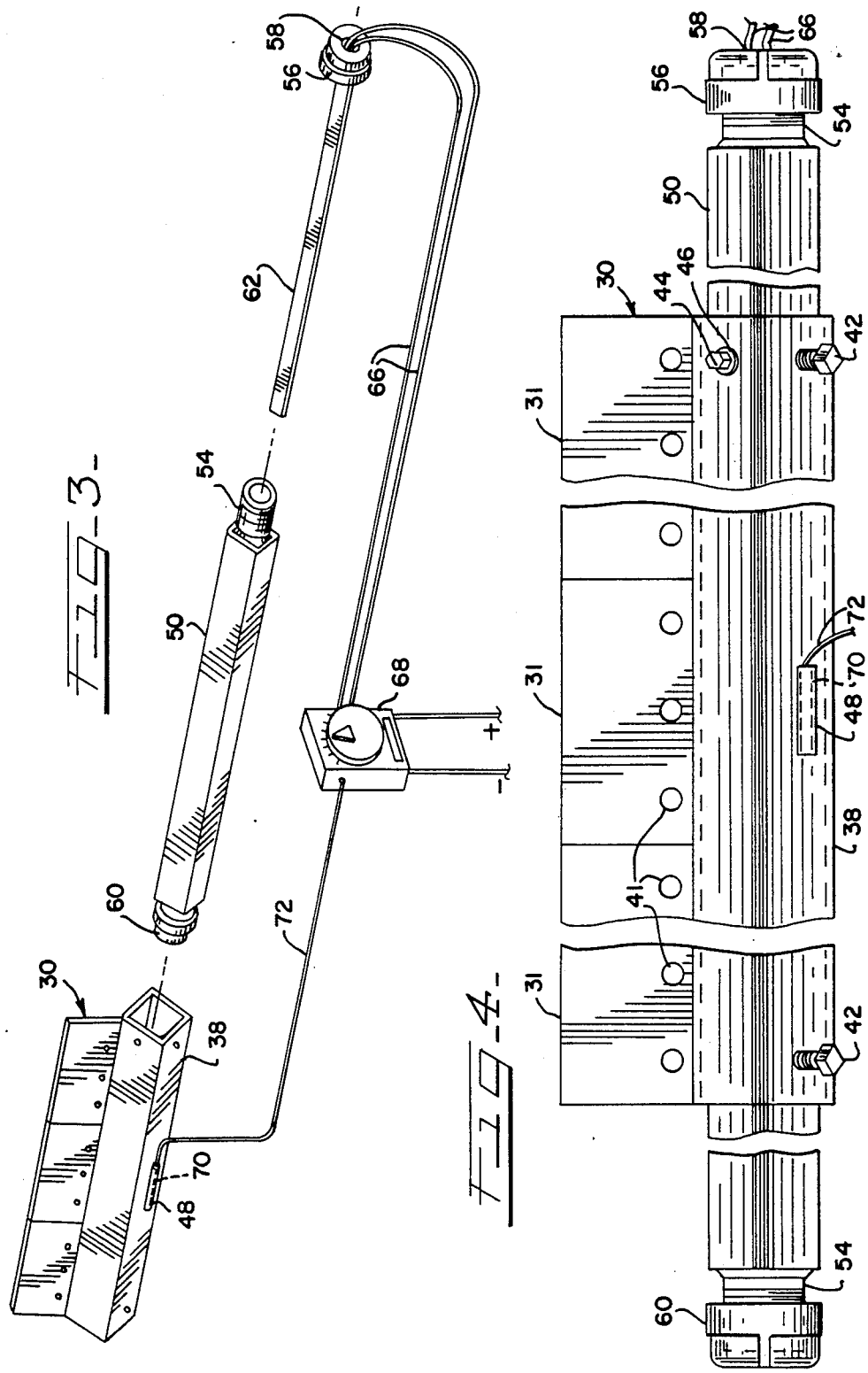

HEATED CONVEYOR BELT CLEANER

BACKGROUND OF THE INVENTION

The present invention relates to conveyor belt cleaners which are used to remove residual material which clings to a conveyor belt. The removal of this residual material from the belt is especially troublesome where the material that adheres to the belt is very sticky or freezes to the belt. Such adherent materials are encountered, for example, with raw sugar belts, molasses belts, belts handling asphalt, belts conveying tar sands, belts conveying frozen foods and belts exposed to winter weather conditions.

A heated conveyor belt cleaner has been found to be useful in the removal of adherent material from a conveyor belt. In the use of heated belt cleaners, the ability to maintain a uniform scraper blade temperature is very important as is the ability to adjust the scraper blade temperature to different temperatures for particular uses. To prevent damage to the conveyor belt, the tip of the scraper blade must never reach a temperature that can break down the properties of the conveyor belt or melt into the conveyor belt. Most belts that are rubber coated and which are designed for elevated temperatures have an upper temperature range of approximately 450° F. which can easily be exceeded by many common heating means. In contrast, belts which are exposed to extreme weather conditions are usually designed for low temperature flexibility, and not elevated temperatures, requiring the scraper element temperature to be high enough to de-ice the belt, but not reach a high enough temperature to damage the belt surface.

The materials which are transported on a conveyor belt are often temperature sensitive requiring the scraper element temperature to fall within a certain range of temperatures. For example, if you are cleaning asphalt residue from the belt, the temperature range between having flowing liquid asphalt and cooking the asphalt into a solid coke-like material is fairly narrow. Mechanisms used for the removal of adherent materials are shown in U.S. Pat. Nos. 337,318, 867,739, 1,793,246, 2,878,926, 3,795,308 and 3,815,728. U.S. Pat. No. 4,182,444 discloses a mechanism for the heating of a scraper blade for the removal of adherent material.

SUMMARY OF THE INVENTION

The present invention provides a heated conveyor belt cleaner which is particularly useful for the removal of sticky and frozen material from a conveyor belt. The scraper element which is in contact with the belt is heated by conduction from a heating element which is disposed within a shaft which supports the scraper element. The location of the heating element within the support shaft provides protection for the heating element and avoids direct handling of the heating element when changing scraper elements. A thermostat senses the temperature of the scraper element and correspondingly adjusts the amount of heat produced by the heating means to provide a predetermined uniform scraper element temperature. The scraper element and its mounting sleeve are also easily removed and replaced on the support shaft.

DESCRIPTION OF THE DRAWINGS

FIG. 3 is an exploded view of the heated conveyor belt cleaner.

FIG. 4 is a side-view of the heated conveyor belt cleaner.

DESCRIPTION OF THE PREFERRED EMBODIMENT

Figure 1:
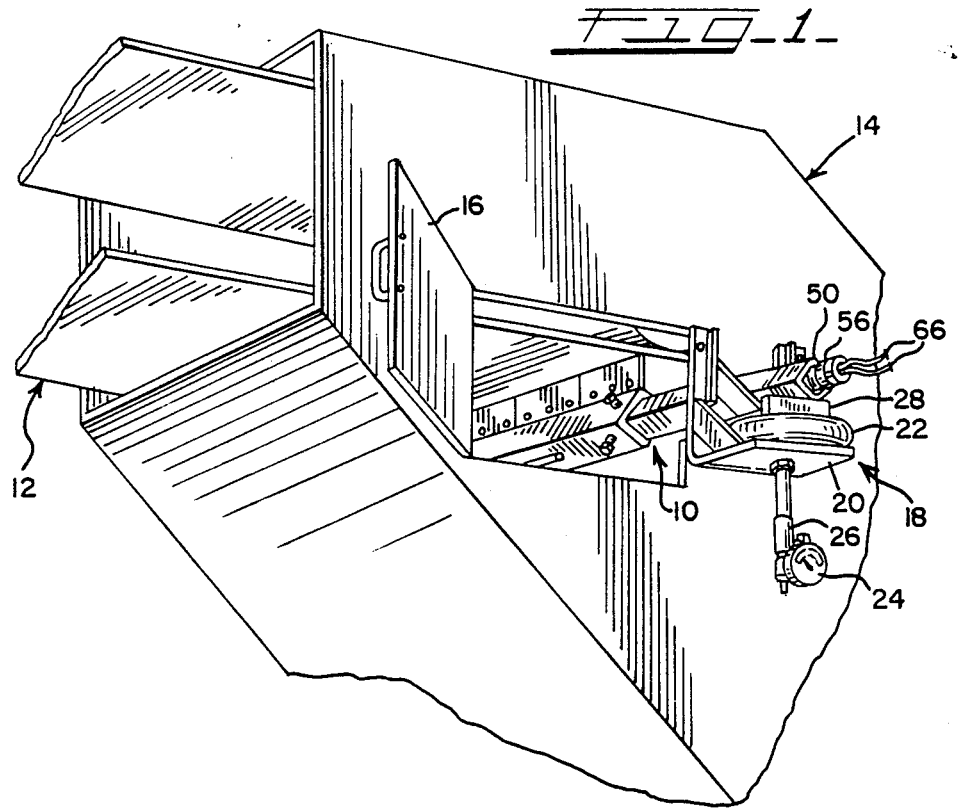
FIG. 1 is a perspective view of the heated conveyor belt cleaner shown within a conveyor chute and mounted on air actuators.
Figure 2:
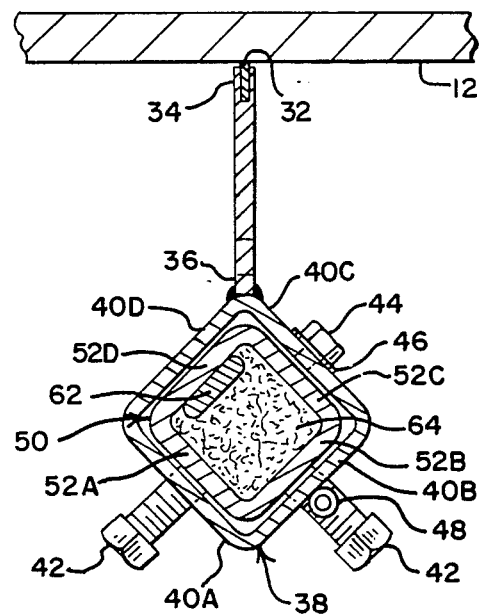
FIG. 2 is a cross-sectional end view of the support shaft and mounting arrangement of the heated conveyor belt cleaner.

FIG. 1 illustrates the heated conveyor belt cleaner 10 in scraping engagement with a conveyor belt 12 which empties into a conveyor chute 14 having an access door 16. The belt cleaner 10 is supported at each end by air actuators mounts 18. Each air actuator mount 18 has a mounting plate weldment 20 upon which an inflatable air bag 22 is located. An air pressure gauge 24 and a shut off cock valve 26 are connected to the air bag 22. A slider plate weldment 28 is located on top of the air bag 22 and grips one end of the belt cleaner 10. A supply of compressed air (not shown) is supplied to the air gauge 24. Using the cock valve 26 a sufficient amount of air is released into the air bag 22 to bring the scraper element of the belt cleaner 10 into contact with the belt 12 and to provide the desired amount of contact pressure between the belt cleaner 10 and the belt 12. As the belt cleaner 10 wears down additional air may be released into the air bag 22 to keep the contact pressure constant. A preferred air actuator mount is the Durt Tracker reversing air mount manufactured by Martin Engineering Company of Neponset, Ill. FIGS. 1 and 2 illustrate the conveyor belt cleaner mounted underneath the exterior surface of the return run of the belt which is its normal location. It is, however, within the scope of the present invention to mount the cleaner above the return run to clean the inner belt surface or to mount cleaners both above and below the return run to clean both surfaces simultaneously.

As shown in FIGS. 2 and 4, the belt cleaner 10 has a scraper element 30 which consists of a plurality of blades 31 which are welded to one another. A single blade extending the width of the belt can also be used. The scraper element 30 has a tungsten carbide tip 32 inserted into a slot in the first end 34 of the scraper element 30. The second end 36 of the scraper element 30 is welded to a mounting sleeve 38 which consists of a square tube having walls 40A–D. The scraper element 30 is shown in FIG. 4 having apertures 41 which alternatively permit bolting of the scraper element 30 as opposed to welding. Set screws 42 are threaded into each end of mounting tube walls 40A and 40B. A ground nut 44 and a washer 46 are fastened to one end of mounting tube wall 40C. A short piece of tubing 48 is welded to the central portion of mounting tube wall 40B.

A support shaft 50 consisting of a square tube having walls 52A–D fits in close proximity concentrically within mounting sleeve 38. A round threaded nipple 54 is welded to each end of the support shaft 50. A tapped pipe cap 56 having a threaded opening 58 is fastened to the nipple 54 nearest the ground bolt 44. A second pipe cap 60 is fastened to the remaining nipple 54. The nipples 54 and the pipe caps 56 and 60 are sized to be capable of passing within the mounting sleeve 38.

A heating element 62, best shown in FIG. 3, is located within the support shaft 50 adjacent to wall 52D as shown in FIG. 2 and extends the length of the scraper element 30. A preferred heating element 62 is an electrical resistance heating element having a capacity of 23 watts per square inch. The remaining space within the support shaft 50 is filled with a heat conducting material 64 such as stainless steel wool, although other materials such as sand, or fluids such as water, oil or air may be used. The heating element 62 has a pair of lead wires 66 which extend through opening 58 and are connected to a control 68. The control 68 is a thermostat having a temperature sensing probe 70 connected to it. The temperature probe 70 is located within the tubing 48 which is attached to the mounting sleeve 38. Alternatively the temperature sensing probe can be connected directly to the scraper element 30. Ground wires (not shown) are fastened to the mounting sleeve 38 by the ground bolt 44.

The mounting sleeve 38 is placed concentrically around the support shaft 50, with the scraping element 30 positioned to engage the belt 12. The set screws 42 are then tightened bringing mounting tube walls 40C and 40D into contact respectively with support shaft walls 52C and 52D. As the control 68 activates the heating element 62, heat is transmitted from the heating element 62 to the support shaft 50 through the heat conducting material 64 and by direct contact with the heating element 62 with support shaft wall 52D. The heat is then conducted to the mounting sleeve 50, then to the scraper element 30 and the tungsten carbide tip 34. As a result of this arrangement in which the mounting sleeve 38 surrounds the shaft 50 and its internally disposed heating element 62, a uniform temperature of the cleaning blade results. This arrangement also maximizes heat conductivity and minimizes heat loss.

The temperature sensing probe 70 is located within tubing 48 and senses the temperature of the mounting means 38. While the temperature probe 70 may be attached directly to the scraper element 30, attachment to the mounting sleeve 38 is preferred to provide additional protection to the temperature probe 70 from vibration and falling residue. The temperature of the mounting sleeve 38 gives a good indication of the temperature of scraper element 30 as the difference between the two temperatures do not vary by more than 25° F. The control 68 may be set for any temperature, out of a range of temperatures, to suit a particular application. As the control 68 receives the temperature reading from the temperature probe 70, the control 68 will either increase or decrease the heat output of the heating element 62 to maintain a uniform desired temperature at the scraper element 30.

Once the carbide tip 32 is worn past acceptable limits, the temperature probe 70 and any ground wires are removed, the set screws 42 are loosened, and the mounting sleeve 38 and attached scraping elements are slidably removed from either end of the support shaft 50 and replaced.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A heated conveyor belt cleaner including a support shaft positioned adjacent the belt to be cleaned and generally transverse to its direction of travel, heating means including an electrical resistance heating element disposed internal to said shaft said heating element adapted to generate heat within said shaft and to thereby heat said shaft, at least one mounting sleeve slidably supported on said shaft for mounting a belt scraper element, at least one belt scraper element adapted to be positioned in contact with said belt to be cleaned and connectable to said mounting sleeve and, through said mounting sleeve, to said shaft such that heat generated by said heating element within said shaft is communicated from said shaft through said mounting sleeve to said scraper element to heat said element for effective removal of adherent materials from said conveyor belt.

2. A heated conveyor belt cleaner as in claim 1 wherein said mounting sleeve and said support shaft are rectangular tubes with the mounting sleeve sized to slide over and fit in close proximity concentrically with the support shaft.

3. A heated conveyor belt cleaner as in claim 1 wherein the heat conductivity of the mounting arrangement is such that the temperature differential between said scraper element and said mounting sleeve is less than 25° F.

4. A heated conveyor belt cleaner as in claim 1 including temperature control means associated with said heating element to selectively vary the temperature of said heating element to thereby control the temperature of said scraper element.

5. A heated conveyor belt cleaner as in claim 4 including temperature sensing means associated with said scraper blade to determine the temperature of said scraper blade.

6. A heated conveyor belt cleaner as in claim 5 including a thermostat connected to said temperature control means and said temperature sensing means so as to maintain the temperature of said cleaner blade at a preselected level.

7. A heated conveyor belt cleaner as in claim 1 including heat conducting means disposed within said support shaft in heat conducting relationship with said heating element and said support shaft to effectively conduct heat from said heating element to said shaft.

* * * * *